US008851006B2

(12) United States Patent
Burga

(10) Patent No.: US 8,851,006 B2
(45) Date of Patent: Oct. 7, 2014

(54) HYDRO-AERODYNAMIC SURFING BIB AFFIXABLE TO A WETSUIT COMPRISING RETRACTABLE REMOVABLE FOLDING REVOLVING MOTORIZEDLY STEERABLE PECTORAL FLIPPERS AND KEELS, AND WITH BUILT-IN RECHARGEABLE BATTERY-PROPELLED ENGINE AND SOLAR ENERGY CAPTURER/COLLECTOR

(76) Inventor: Oswaldo Nicolas Burga, Lima (PE)

( * ) Notice: Subject to any disclaimer, the term of this patent is extended or adjusted under 35 U.S.C. 154(b) by 121 days.

(21) Appl. No.: 13/197,115

(22) Filed: Aug. 3, 2011

(65) Prior Publication Data
US 2013/0031691 A1 Feb. 7, 2013

(51) Int. Cl.
*B63C 11/46* (2006.01)
*B63C 9/08* (2006.01)
*A63B 69/00* (2006.01)
*A63B 35/12* (2006.01)

(52) U.S. Cl.
CPC ............. *A63B 35/12* (2013.01); *A63B 69/0093* (2013.01); *B63C 11/46* (2013.01); *A63B 2210/50* (2013.01)
USPC .......................................... 114/315; 441/106

(58) Field of Classification Search
CPC .... A63B 35/00; B63C 11/46; A41D 2400/24; B63B 35/73; B63H 16/08
USPC .............................. 114/315, 312; 441/65, 106
See application file for complete search history.

(56) References Cited

U.S. PATENT DOCUMENTS

| 252,324 | A | * | 1/1882 | McDonald | 440/24 |
| 2,312,976 | A | * | 3/1943 | Pels | 440/38 |
| 5,365,868 | A | * | 11/1994 | Culotta | 114/315 |
| 6,526,584 | B1 | * | 3/2003 | Hunter | 2/2.16 |
| 6,659,689 | B1 | * | 12/2003 | Courtney et al. | 405/186 |
| 6,823,813 | B2 | * | 11/2004 | Mazin | 114/315 |
| 6,942,359 | B2 | * | 9/2005 | Furth et al. | 362/205 |
| 7,124,701 | B2 | * | 10/2006 | Valente | 114/315 |
| 7,223,143 | B1 | * | 5/2007 | Martin | 441/80 |
| 7,740,418 | B2 | * | 6/2010 | Adams | 405/186 |
| 7,753,750 | B2 | * | 7/2010 | Gutierrez | 441/80 |
| 8,342,896 | B1 | * | 1/2013 | Sardar | 440/27 |
| 2013/0217281 | A1 | * | 8/2013 | Gadler | 441/115 |

* cited by examiner

*Primary Examiner* — Stephen Avila
*Assistant Examiner* — Andrew Polay

(57) ABSTRACT

Hydra-aerodynamic Surfing Bib affixable to a WetSuit Comprising Retractable Removable Folding Revolving Motorizedly Steerable Pectoral Flippers And Keels, And With Built-In Rechargeable Battery-Propelled Engine And Solar Energy Capturer/Collector. The present invention relates to: (A) Water use embodiments for surfing. (A) The matter is about a body garment called curved hydrodynamic water bib wet suit; such wet suit the chest casing of which, in addition to that, has flippers and keels: (1) removable; (2) revolving; (3) folding; (4) retractable. The bib wet suit (A) consists of two versions: (i) a short version: a bib wet suit; (ii) a long version: a complete body bib wet suit. Where optionally (A) can contain: (a) engines for steering the flippers and keels; (b) a jet propulsion feed engine and/or propeller, which is energized with one or more rechargeable batteries capable of being linked and plugged in to fit tightly to each other forming stacks or heaps, or any other analogous; (c) elements for capture and production of solar energy to operate electrically the motorized bib; such solar energy capturers namely collectors are used to recharge the batteries and boost other electronic telematic and audiovideo gadgets; for ex: telephones, computers. Optionally (A) has swimming cells having capacity to contain air and/or oxygen and/or gas and/or water and/or oil and/or grease and/or other floating materials (expanded polyestyrene EPS, PVC/NBR Ensolite foam, polyurethane PUR foam, elastomer, among other analogous polymers) and/or other elements. The floating materials, are in order to improve floatability, thermal insulation and water maneuverability for the user of the present invention.

2 Claims, 15 Drawing Sheets

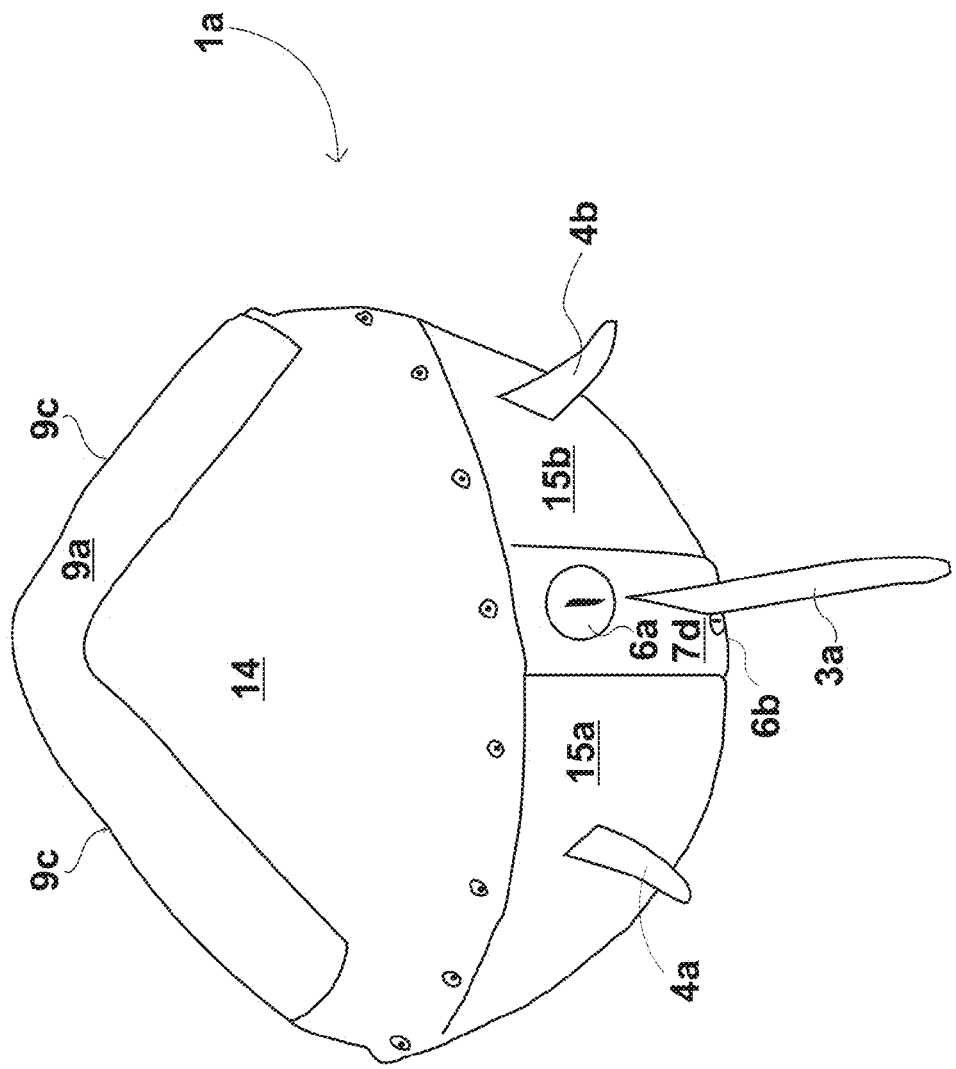

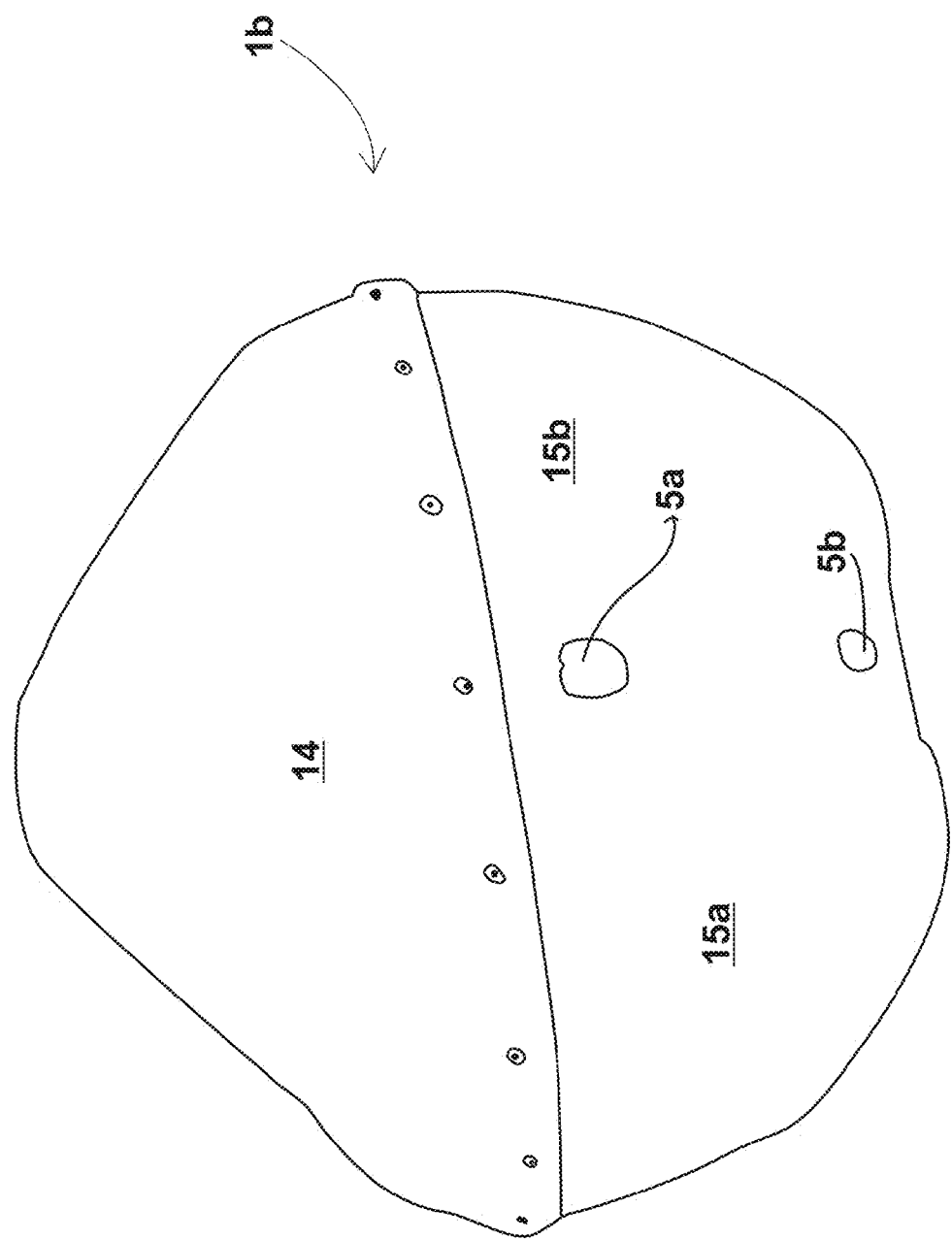

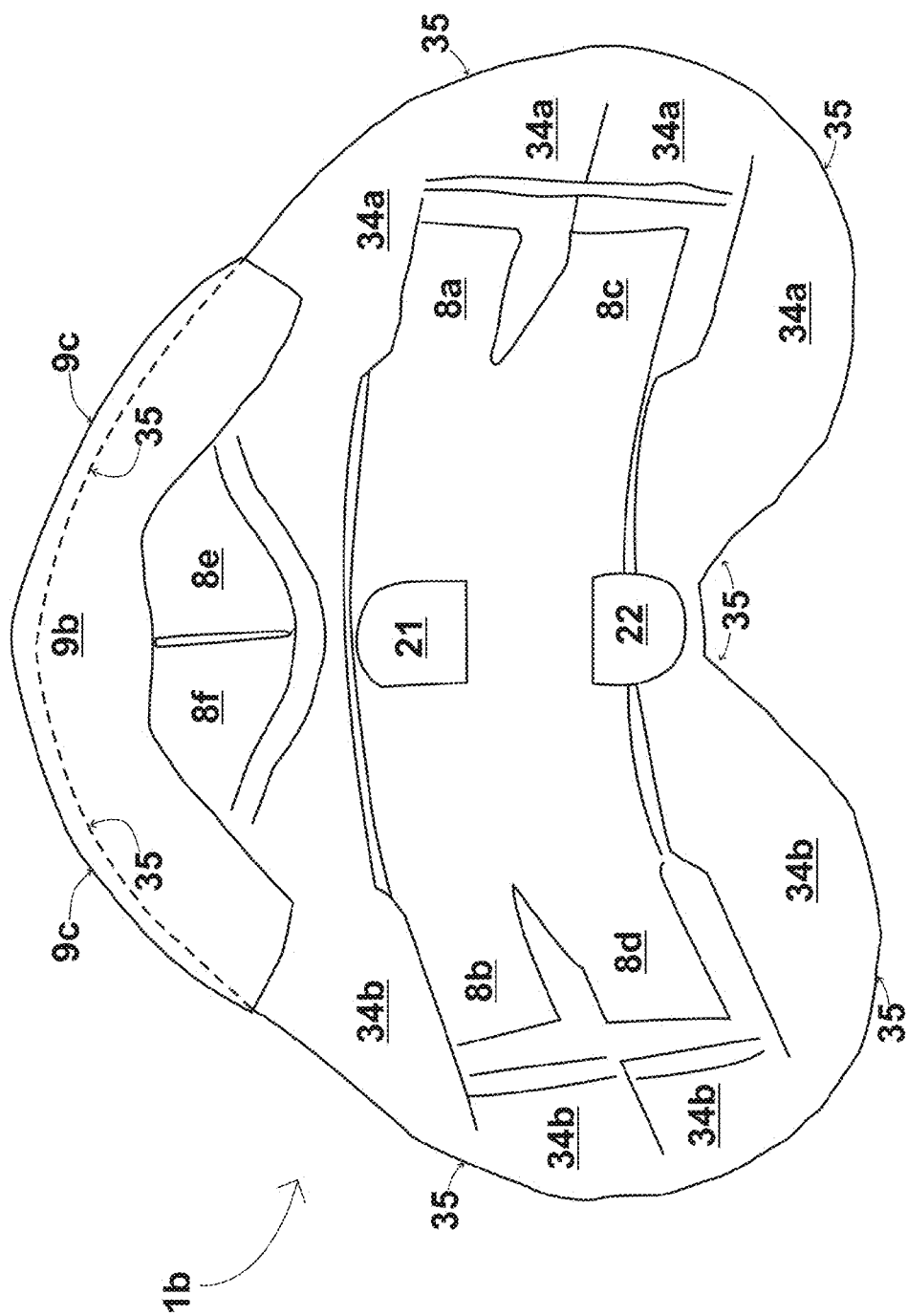

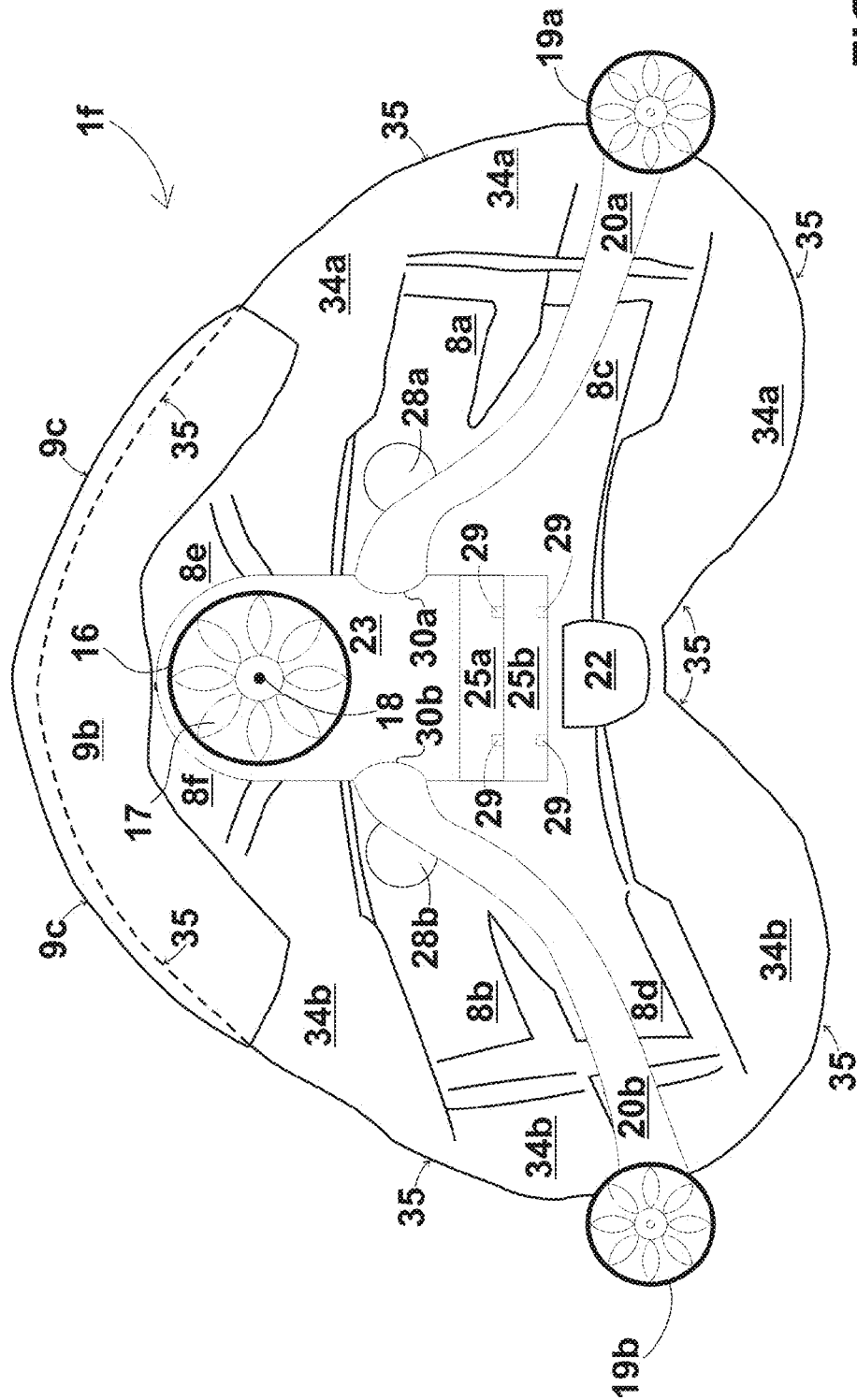

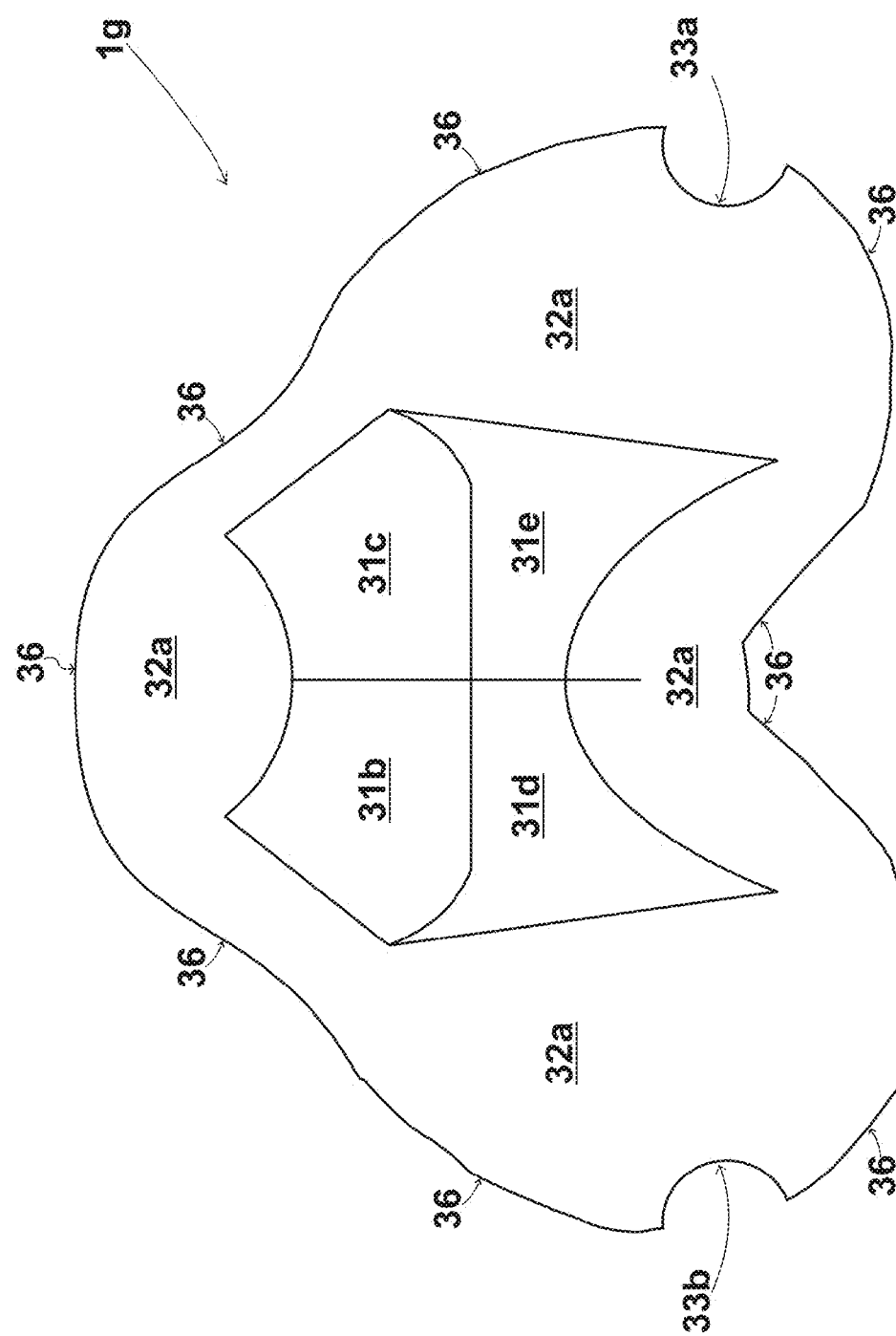

HYDRO-AERODYNAMIC SURFING BIB AFFIXABLE TO A WETSUIT COMPRISING RETRACTABLE REMOVABLE FOLDING REVOLVING MOTORIZEDLY STEERABLE PECTORAL FLIPPERS AND KEELS, AND WITH BUILT-IN RECHARGEABLE BATTERY-PROPELLED ENGINE AND SOLAR ENERGY CAPTURER/COLLECTOR

RELATED APPLICATIONS

Copyright

This application is the first one of its kind. The designs are embodiments and characters having a copyright since their submission for application as an invention patent to proceed, and subsequently they will form part of submissions of applications for copyright (visual art and text).

BACKGROUND OF THE INVENTION

1. Technical Field of the Invention

The present invention relates to: (A) Embodiments for surfing practice, for swimming activity, underwater activity and subsidiarily aerial activity. (A) The matter is about hydroaerodynamic body garments or outfits. Said garments or outfits, are more exactly "surfing bibs" having pectoral flippers and keels which are: (1) removable; (2) revolving; (3) folding; (4) retractable. Where (A) comprises two versions: (i) surfing bib alone; (ii) surfing bib integrated to a wetsuit or a drysuit. Where optionally (A) can contain (a) servomotors and/or battery engines for steering the flippers and keels; (b) a battery-propelled engine; (c) elements of capture and production of solar energy namely solar cells or panels as energy feeders. Optionally (A) has inner cells capable of being filled with air and/or gas and/or water and/or oil and/or grease and/or floating materials (for example: polyurethane PUR foam, expanded polyestyrene EPS, PVC/NBR Ensolite foam, among other analogous polymers and elastomers) in order to increase and improve floatability and maneuverability.

2. Background of the Present Invention—State of Technology

The whole state of the current technique knows various biological and artificial multifunctional and utilitarian forms of embodiments for use in water environments.

I) Fast Spindle-Shaped Water Animals—Sailfish

Sailfish (Class: Actinopterygii, Genus: *Istiophorus*, Family: Istiophoridae) ranks second as the fastest fish in the sea, it can reach a swimming speed of 109 km/h thanks to its muscled and hydro-aerodynamic body. It can jump as long as 2 meters. It is longer than 3 meters and weighs more than. It feeds basically on squid and other fish.

II.) Fast Spindle-Shaped Water Animals—Mako Shark

Mako shark (Class: Chondrichthyes, Subclass: Elasmobranchii, Genus: *Isurus*, Family: Lamnidae) reaches the speed of 124 km/h. It is the fastest fish in the sea and it is ranked seventh among the fastest animals in the world, including birds and mammals. It grows to a length of 4.5 meters and reaches a weight of 750 kg. It has a perfect hydrodynamic force. It is homeothermic, which trebles its muscular power, allowing it do sudden starts, aside from taking very high leaps outside the water, which can reach between 6 and 8 meters height.

III.) Fast Spindle-Shaped Water Animals—Flying Fish (Exocoetid)

Flying fish (Class: Actinopteryigii, Order: Beloniformes, Family: Exocoetidae), having unusually big pectoral fins, can fly and glide over distances of more than 50 meters at speeds between 50 and 60 km/h. These kilometers and speeds are possible to be reached thanks to the quick flapping of its wings (about 50 times per second).

IV.) Surfing Devices

There are many types e.g. surfboards, kiteboards, skis, among others). The present surfing disclosed outfit is to be wear as a bib, dickey, on the upper body torso or front, this is mainly the chest and abdomen as means of better displacement of the user in aquatic activities. This surfing bib outfit disclose to take better all kind of waves.

V.) Wetsuits

Hunter in U.S. Pat. No. 6,526,584 discloses a one piece wetsuit with a loose trunk this means the lower body, whereas in the present invention is a bib which is optionally intended to be affixed to a conventional wetsuit which has a double lining of neoprene for fastening and or supporting of the surfing bib outfit as seen on the disclose drawings of the present invention.

VI.) Jet-Propelled Animals

Jet propulsion in cephalopods is produced by water being exhaled through a siphon, which typically narrows to a small opening to produce the maximum exhalent velocity. The water passes through the gills prior to exhalation, fulfilling the dual purpose of respiration and locomotion. Sea hares (gastropod molluscs) employ a similar means of jet propulsion, but without the sophisticated neurological machinery of cephalopods they navigate somewhat more clumsily.

Some teleost fish have also developed jet propulsion, passing water through the gills to supplement fin-driven motion.

In some dragonfly larvae, jet propulsion is achieved by the expulsion of water from a specialised cavity through the anus. Given the small size of the organism, a great speed is achieved.

Scallops and cardiids, siphonophores, tunicates (such as salps), and some jellyfish also employ jet propulsion. The most efficient jet-propelled organisms are the salps, which use an order of magnitude less energy (per kilogram per meter) than squid. (Font: Wikipedia, viewable at http://en.wikipedia.org/wiki/Jet_propulsion).

VII.) Engines in General

Pedro Paulet between the years 1895 and 1897 designed, built and set to work the first propulsion engine. He is recognized by Von Braun as the father of aeronautics. The funny thing is that Pedro Paulet found inspiration in squids for devising the shape of the design of his ship. In the year 1936 he came up with the thesis of the sovereignty of the three hundred miles of territorial sea.

There exist ionic engines.

Then, electrochemical engines working by hydrogen-based fuel batteries.

Aside from that, magnetic engines (see: www.youtube.com).

There also exist magnetic plasma engines.

VIII.) Jet Propulsion Engines

Jet propulsion is thrust produced by passing a jet of matter (typically air or water) in the opposite direction to the direction of motion. By conservation of momentum, the moving body is propelled in the opposite direction to the jet.

A number of animals, including cephalopods, sea hares, arthropods, and fish have convergently evolved jet propulsion mechanisms. This is most commonly used in the jet engine, but is also the means of propulsion utilized by NASA to power various space craft. (Font: Wikipedia viewable at http://en.wikipedia.org/wiki/Jet_propulsion).

The present invention relates to jet surfing bibs to be wear basically on the upper body of the user.

IX.) Convergent-Divergent Nozzles

A de Laval nozzle (or convergent-divergent nozzle, CD nozzle or con-di nozzle) is a tube that is pinched in the middle, making a carefully balanced, asymmetric hourglass-shape. It is used to accelerate a hot, pressurized gas passing through it to a supersonic speed, and upon expansion, to shape the exhaust flow so that the heat energy propelling the flow is maximally converted into directed kinetic energy. Because of this, the nozzle is widely used in some types of steam turbines, and is used as a rocket engine nozzle. It also sees use in supersonic jet engines. (Font: Wikipedia viewable at http://en.wikipedia.org/wiki/Convergent-divergent_nozzle).

The present invention presents excerpts of this technology—de Laval nozzles—in the jet propulsion engine dual nozzle side exhausts of the motorized hydro-aerodynamic surfing bib which is comprised.

X.) Underwater Propulsion System Having Reduced Weight Penalty and Variable Angle of Thrust Culotta in U.S. Pat. No. 5,365,868 discloses a propulsion system to be located at the users back waist, therefore is different in location from the present invention which is located on the front.

XI.) Leg Propulsion Device for Swimmers and Divers

Mazin in U.S. Pat. No. 6,823,813 discloses a propulsion device to be located at least to one of user's leg, concluding different positioning from the present invention which is to be located at the torso.

XII.) Surfing Skis

Friedrich in U.S. Pat. No. 7,955,150 discloses a surf ski system to enable a user to surf waves with a pair of skis strapped to the feet, therefore they are of use and appearance different from that of the present invention in body location and having no engine.

XIII.) Surfboard with Jet Propulsion Engines

Hsia in U.S. Pat. No. 7,833,072 A jet propelled surfboard with manual jet propulsion is a different invention as it is not used in the form of a suit for wear and does not have an engine.

XIV.) Batteries

Less weight and volume, more power and duration; that exists currently in the market. The lithium-sulfur battery (Li—S battery) is a rechargeable battery, notable for its high energy density. By virtue of the low atomic weight of lithium and moderate weight of sulfur, Li—S batteries are relatively light; about the density of water. They were demonstrated on the longest and highest-altitude solar-powered airplane flight in August, 2008. Lithium-sulfur batteries may succeed lithium-ion cells because of their higher energy density and reduced cost from the use of sulfur.

Chemical processes in the Li—S cell include lithium dissolution from the anode surface (and incorporation into alkali metal polysulfide salts) during discharge, and reverse lithium plating to the anode while charging. This contrasts with conventional lithium-ion cells, where the lithium ions are intercalated in the anode and cathodes. Consequently Li—S allows for a much higher lithium storage density. Polysulfides are reduced on the cathode surface in sequence while the cell is discharging:

$$S_8 \rightarrow Li_2S_8 \rightarrow Li_2S_6 \rightarrow Li_2S_4 \rightarrow Li_2S_3$$

Across a porous diffusion separator, sulfur polymers form at the cathode as the cell charges:

$$Li_2S \rightarrow Li_2S_2 \rightarrow Li_2S_3 \rightarrow Li_2S_4 \rightarrow Li_2S_6 \rightarrow Li_2S_8 \rightarrow S_8$$

These reactions are analogous to those in the sodium-sulfur battery. (Font: Wikipedia. viewable at http://en.wikipedia.org/wiki/Lithium%E2%80%93sulfur_batteries).

XV.) Flashlight that can Operate with Alternative Size Batteries

Furth in U.S. Pat. No. 6,942,359 the battery ends as depicted in FIG. 1 are merely in contact, whereas in the present invention the batteries are tightly pluggable as it can be seen in FIG. 8C where the front end of battery 25b is plugged so forth to the rear end into the housings 29 of battery 25a by two studs settings located in the front end of said batteries, thus permitting a snug fit or tightly sealed engagement between said batteries summing/adding energy in serial circuit or parallel.

XVI.) Solar Energy

16% to 3% efficiency solar energy collectors, some are even flexible and are suitable to be installed in a suit as the one disclosed and claim in the present invention.

XVII.) Floating Materials

Are those substances less dense than water. The present invention discloses a bib with internal celled compartment capable of containing different elements to convenience usage.

XVIII.) Body Casts and Dynamic Covers

The present surfing bib disclosed, is a front cover and as many material may be use in its construction, in essence without a limit, there exists the possibility of being bullet proof and even armored. This in and around the legal protection of this patent is by this disclosure noticed and claimed.

XIX.) Nanotechnology Applied to the Present Invention

There exist patents granted and in process comprising nanotechnology. Nanotechnology is the study, design, creation, synthesis, manipulation and application of materials, equipment and functional systems by means of controlling matter at nanoscale as well as exploitation of phenomena and properties of matter at nanoscale. A nanometer is equal to one billionth of a meter. The symbol of nanometer is nm.

When matter is manipulated at such a tiny scale as atoms and molecules, it shows totally new phenomena and properties. That is why scientists use nanotechnology to devise completely new low-cost materials, equipment and systems having unique properties.

Nanotechnology promises avant-garde more efficient solutions to environment problems, as well as to many other human kind has to deal with. It could be used to solve many of the problems of human kind, but it also could create very powerful weapons. This means more powerful jet propulsion engines as for the hydro-aerodynamic surfing bib.

Traditional companies will be able to benefit from nanotechnology in order to improve their competitiveness in such customary sectors as textiles, feeding, footwear, automotive industry, construction and health. What is intended is that the companies belonging to traditional sectors incorporate and apply nanotechnology in their processes in order to contribute to job sustainability. Currently the daily use figure is of 0.1%. With the help of programs for access to technology it has been predicted that in 2014 it will be of 15% in manufacturing use and production.

It is suggested that the materials, polymers and elastomers constituting the present invention can optionally be modified now and in the future by using nanotechnology; particularly nanotubes, in order to give the constituting elements, A) size reduction, B) more resistance to wearing away or spoiling of materials—in particular to: 1. Nozzle(s) oversleeve(s), exhaust pipe(s); and 2. The propeller(s) which get worn away by cavitation and C) more power to engine. All this by enabling user to move like a human missile both hydrodynamically in the water and aerodynamically on the air.

The present invention, on claiming both the surfing bib and its curved spindle-shaped dynamic format, as well as the elements which constitute it, enables future optimizations and incorporations, respecting the copyright of the author of the present invention.

SUMMARY OF THE INVENTION

Surfing is a popular sport. With the creation of the hydro-aerodynamic surfing bib wet suit comprising retractable removable folding revolving motorizedly steerable pectoral flippers and keels, with built-in rechargeable battery-propelled engine and a solar energy capturer, namely solar modules such as cells and panels, it is possible to pass through and surf water environments such as waves, seas, oceans, rivers, estuaries, lakes, lagoons, ponds, water outcrops and other water bodies hydro-aerodynamically easily. It is easy as the steerability of the keel and of the flippers, just as it happens with water animals, together with the optional version with floatation and the optional version of motorized propulsion of the present invention, enables people to glide forwards in water environments submerged in the water, half submerged or shallowly submerged, enabling them in their turn to make radical or subtle turns in the water and even performing aerial maneuvers (e.g. Jet-skis jump out of the water). The batteries of the present invention have the capacity of linking one another as they have studs to fit into housing and set tightly together like lego bricks. The solar energy capturers such as solar panels or cells are dual, that is, they are both of thermic and photovoltaic type modules. This solar modules disclose capture the photons and convert them into electricity as for charging the batteries of the surfing bib as well as other devices proposed.

BRIEF DESCRIPTION OF THE DRAWINGS

FIG. 3D is a semi frontal view of the hydro-aerodynamic surfing bib having removable repositionable pectoral flippers and keels.

FIG. 4A is a perspective view of the hydro-aerodynamic surfing bib without a keel.

FIG. 4B is an inner view of the hydro-aerodynamic surfing bib where the celled inner tube to contain air and/or water and/or oil and/or such floating materials as polyestyrene, among others, can be seen.

FIG. 8C is an inner view of the motorized hydro-aerodynamic surfing bib where the celled inner tube with the propulsion engine, its basic parts and the batteries can be seen.

FIG. 8D is a rear view of the hydro-aerodynamic surfing bib, where the concave lid which covers comfortably the user's thorax can be seen.

DETAILED DESCRIPTION OF THE INVENTION

Figure 2:
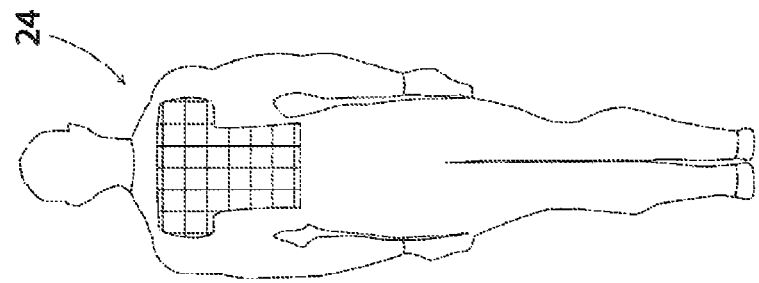
FIG. 2 is a rear view of a person standing and dressed with the wetsuit, showing on his back a celled solar energy capturer/collector in the form of a T.

The present invention is an Hydro-aerodynamic Surfing Bib Wet Suit Having Retractable Removable Folding Revolving Motorizedly Steerable Pectoral Flippers And Keels And With Built-In Rechargeable Battery-Propelled Engine And Solar Energy Capturer/Collector.

The novelty is that this is a surfing bib wet suit. It is optionally a body bib for water use to improve the user's hydrodynamic force, consisting of optionally removable, revolving, folding, retractable flippers and keels and optionally steerable by alternative use of per se known servomotors.

The additional novelty is that, this invention optionally has one or more rechargeable battery-propelled engines. These engines can be of the per se known electric type.

Another novelty is the use of one or more per se known solar energy capturers, which can be dual, that is, of thermic and photovoltaic type.

The claims of the invention revolve about: (A) A surfing water embodiment.

The figures are a preferential model—not the only one— and illustrative of the invention. Therefore, this does not mean that this is the only surfing bib wet suit possible to be made, as there is a number of applicable forms, alterations, combinations and modifications possible to be achieved, and which are the spirit and intention of the present invention. Several combinations of the elements claimed can be made within the range of the present invention.

General Description

According to the present invention, a surfing wet suit having a built-in curved hydrodynamic bib is provided FIGS. 1A, 1B, 3A thru 8D, allowing the user to do maneuvers on water such as surfing; this, more easily, thanks to improvement of capacity of gliding over the water.

In order to achieve these results, a number of accessories have been added to the invented bib wet suit. First of all, the surfing bib must have, in accordance with FIGS. 1A, 1B, 3A-8A, a curved hydro-aerodynamic shape 1, 1*a*, 1*b*, 1*c*, 1*d*, 1*e*, 1*f*, 2, 14, 15*a*, 15*b*, 7*d* and 7*e*, that causes a very little resistance from the bib when gliding over the water, such as it happens with water animals, namely: fish, penguins and other water mammals.

The aforementioned animals glide over the water very easily and swiftly, thanks to their naturally spindle-shaped bodies which the present invention imitates. In this manner, added to the elements incorporated into the bib, which increase its floatability (for example: an air and/or oil and/or grease inner tube and/or floats, among other possible elements), it enables the user to glide over the waves very nimbly, swiftly and with less physical wear, as hydrodynamic resistance gets reduced, thus allowing more maneuverability. Furthermore, the floating elements encapsulated are characterized for being isolating and thermic, providing more comfort to the user during long stays in water. Second, the devised surfing bib contains keels and flippers, having the characteristic of being: removable as depicted in FIGS. 1A, 1B, 3A thru 8A, revolving FIG. 5, folding FIG. 6, retractable FIG. 7.

Figure 1B:
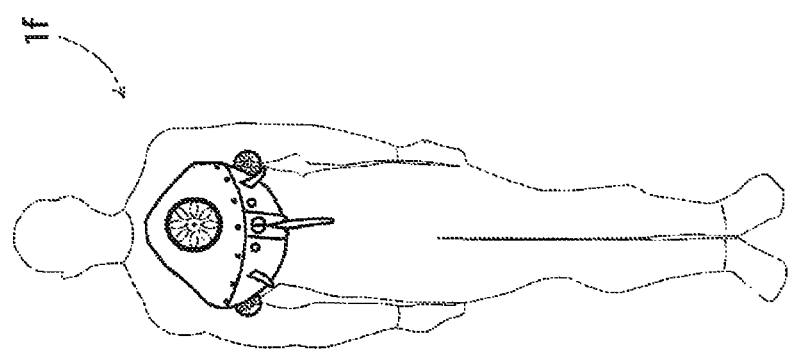
FIG. 1B is a front view of a person standing and dressed with the wet suit, showing on his thorax the part exposed corresponding to the version of the invention motorized hydro-aerodynamic surfing bib with pectoral flippers and keels.
Figures 8A, 8B:
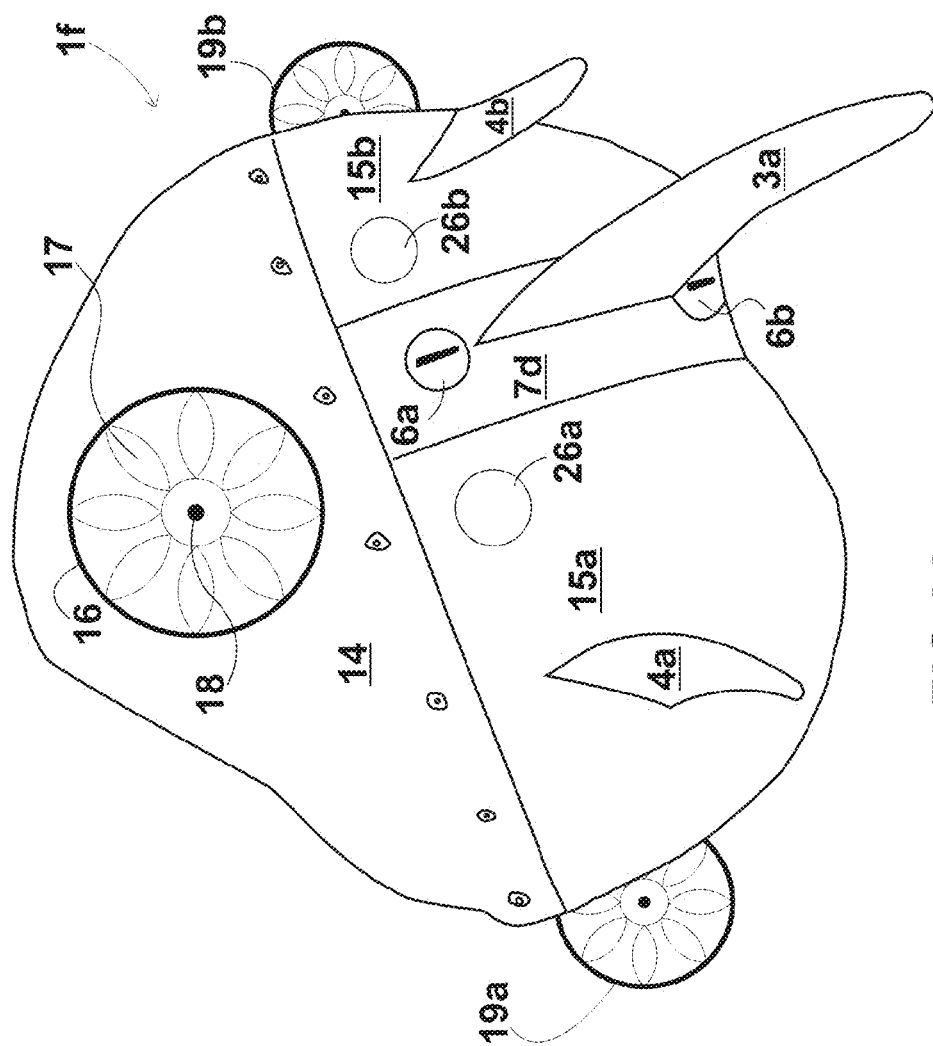
FIG. 8A is a perspective view of the motorized version of the hydro-aerodynamic surfing bib.
FIG. 8B is a cross section view of the relief of the bib, showing the button and spring for driving the propulsion engine of the motorized version of the hydro-aerodynamic surfing bib.

What is more, the motorized version shown in FIGS. 1B, 8A and 8C is also available. The motorization is energized FIG. 8C with setting hence being attachable-detachable batteries 25a, 25b capable to be linked or attached 29 one into another in heaps like lego bricks, and alternatively by solar energy capturers FIG. 2 24 in order to energize the batteries, directly the engine and/or any other audio-video telematic gadget or the like.

Figure 1A:
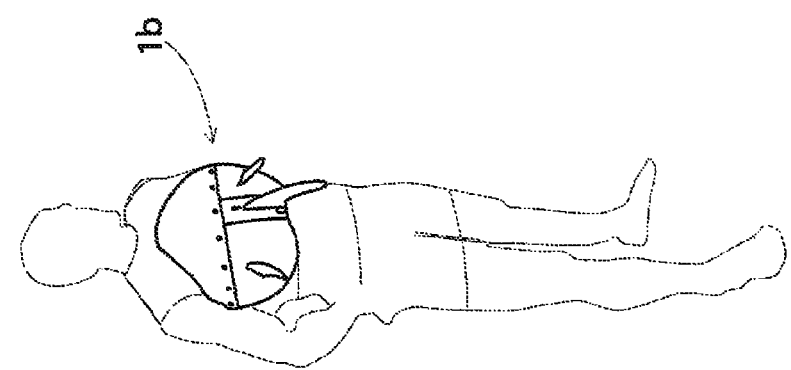
FIG. 1A is a perspective view of a person standing and dressed with the wetsuit, showing on his thorax the part exposed corresponding to the version of the invention hydro-aerodynamic surfing bib with pectoral flippers and keels.

In such sense FIG. 1A illustrates a human figure with the hydrodynamic surfing bib 1b exposed.

FIG. 1B illustrates the motorized version of the hydrodynamic surfing bib 1f exposed.

FIG. 2 illustrates a human figure on whose back the solar capturers/collectors are placed 24. These capturers can be of photovoltaic and/or thermic type.

Figure 3A:
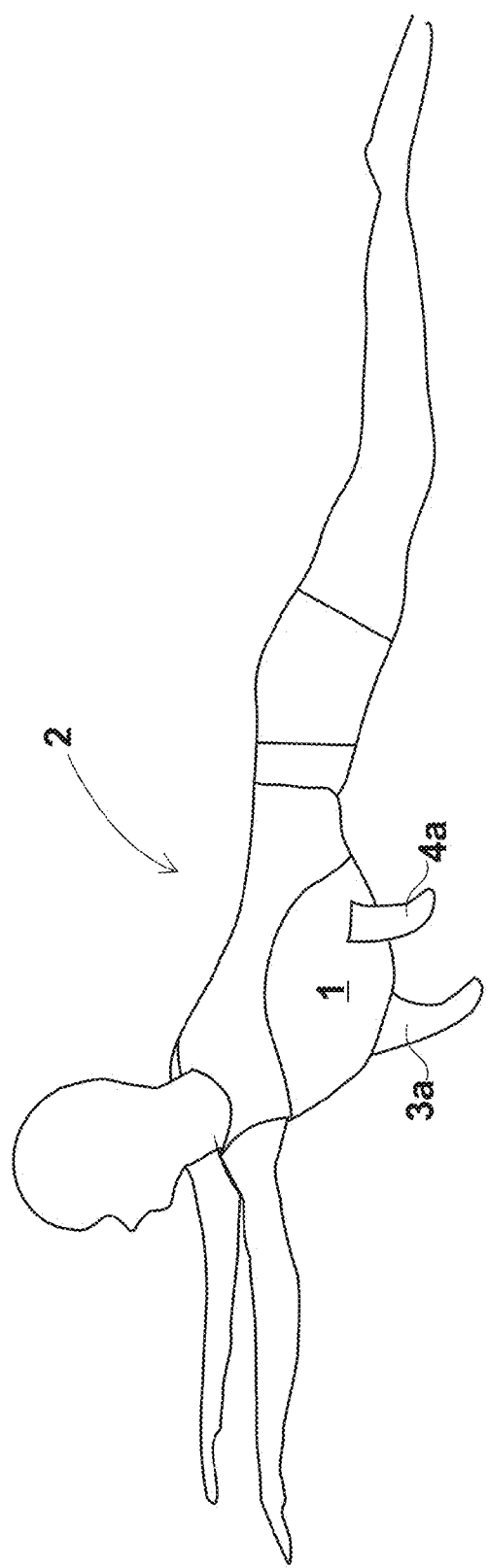
FIG. 3A is a perspective side longitudinal elevation view of a person dressed with the version of the invention hydro-aerodynamic surfing bib wet suit with pectoral flippers and keels

FIG. 3A illustrates a human figure swimming in the water with a sleeveless wetsuit 2 and the hydro-aerodynamic surfing bib 1 with a keel 3a and a flipper 4b.

Figure 3B:
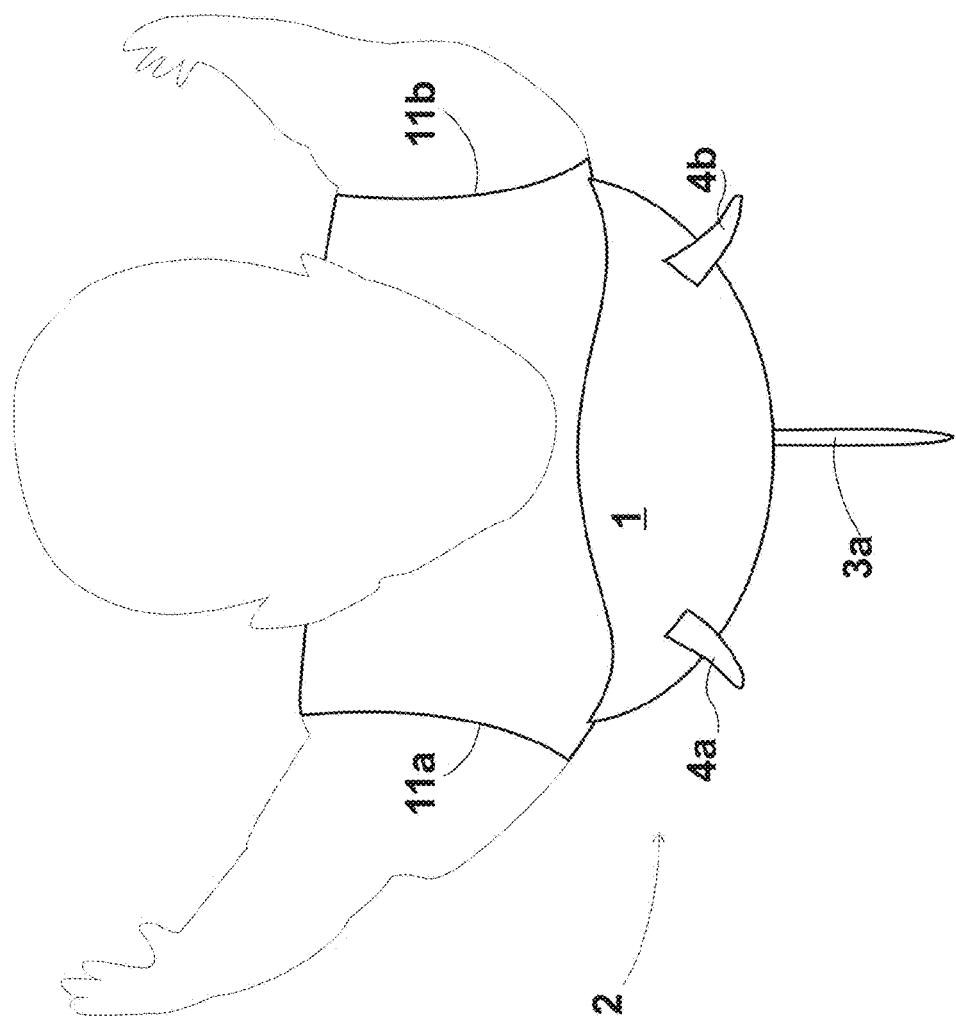
FIG. 3B is a front view of a person wearing the bib outfit suit where the bulging hydro-aerodynamic form of the bib can be seen.

FIG. 3B illustrates a human figure in aquatic activity, surfing with a sleeveless 2 wet suit 11a and 11b and the hydrodynamic surfing bib 1 with a keel 3a and flippers 4a and 4b.

Figure 3C:
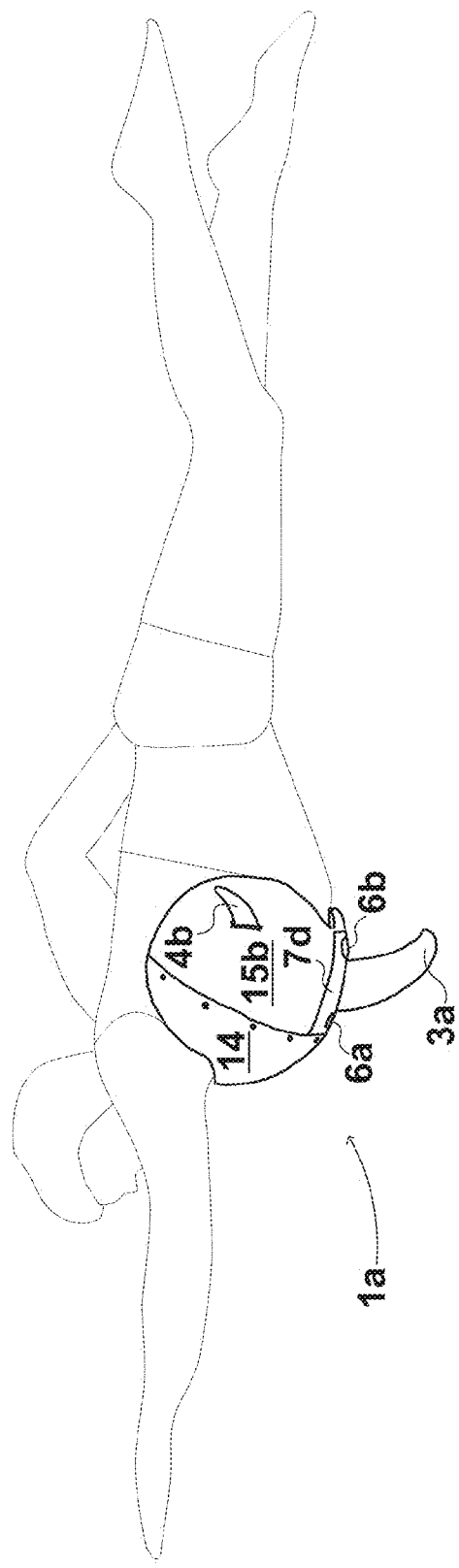
FIG. 3C is a perspective side longitudinal view of a person dressed with a wetsuit, showing the part exposed corresponding to the version of the invention hydro-aerodynamic surfing bib having removable repositionable pectoral flippers and keels.

FIG. 3C illustrates a human figure in water activity with bib 1a exposed.

14 is the front and hydrodynamically curved part of the surfing bib, as can be seen in FIGS. 3C, 3D, 3E, 4A, 5, 6, 7, 8A and 8C.

15a is the curved side part of the right side of the surfing bib, as can be seen in FIGS. 3D, 4A, 5, 6, 7 and 8A.

15b is the curved side part of the left side of the surfing bib, as can be seen in FIGS. 3C, 3D, 3E, 4A, 5, 6, 7 and 8A.

4a is the side flipper of the right side of the surfing bib, and can be seen in FIGS. 1A, 1B, 3B, 3D, 3F, 5 and 8A.

4b is the side flipper of the left side of the surfing bib, and can be seen in FIGS. 1A, 1B, 3A, 3B, 3C, 3D, 3E, 3F, 5 and 8A.

7d is the base of the removable central keel as can be seen in FIGS. 1A, 1B, 3C, 3D, 3E, 6, 7 and 8A.

Figure 5:
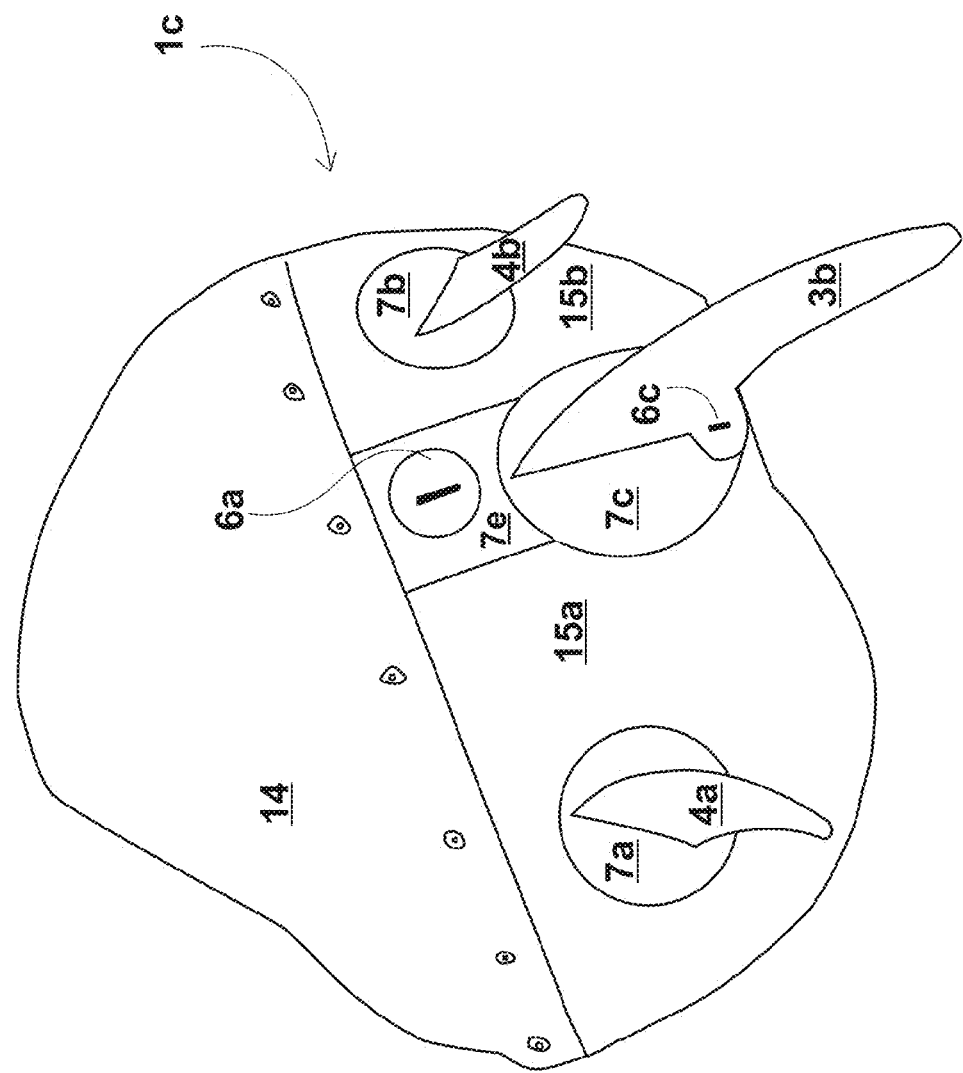
FIG. 5 is a perspective view of the revolving version of the it hydro-aerodynamic surfing bib showing keels and revolving flippers.

7e is the base of the central keel of the revolving version (revolving over its own axis) and removable of the devised bib, as can be seen in FIG. 5.

6a is a retainer of the central keel illustrated in FIGS. 1A, 1B, 3C, 3D, 3E, 5, 6, 7 and 8A.

6b is a retainer of the central keel, illustrated in FIGS. 1A, 1B, 3C, 3D, 3E, 6, 7 and 8A.

6c is a retainer of the central keel illustrated in FIG. 5.

3a is the central keel of the hydrodynamic surfing bib FIGS. 1A, 1B, 3B, 3C, 3D, 3E, 6 and 8A.

3b is the central keel of the bib, revolving version FIG. 5.

FIG. 3D illustrates bib 1a, where 9a is the outer part of a quilted flange made of polymer, elastomer foam. Such quilting can be polyurethane PUR, polyestyrene, Ensolite PVC/NBR, among others. That made of polyurethane foam being the most suitable one. 9c is the perimeter outline of the described quilted flange 9a.

Figure 3E:
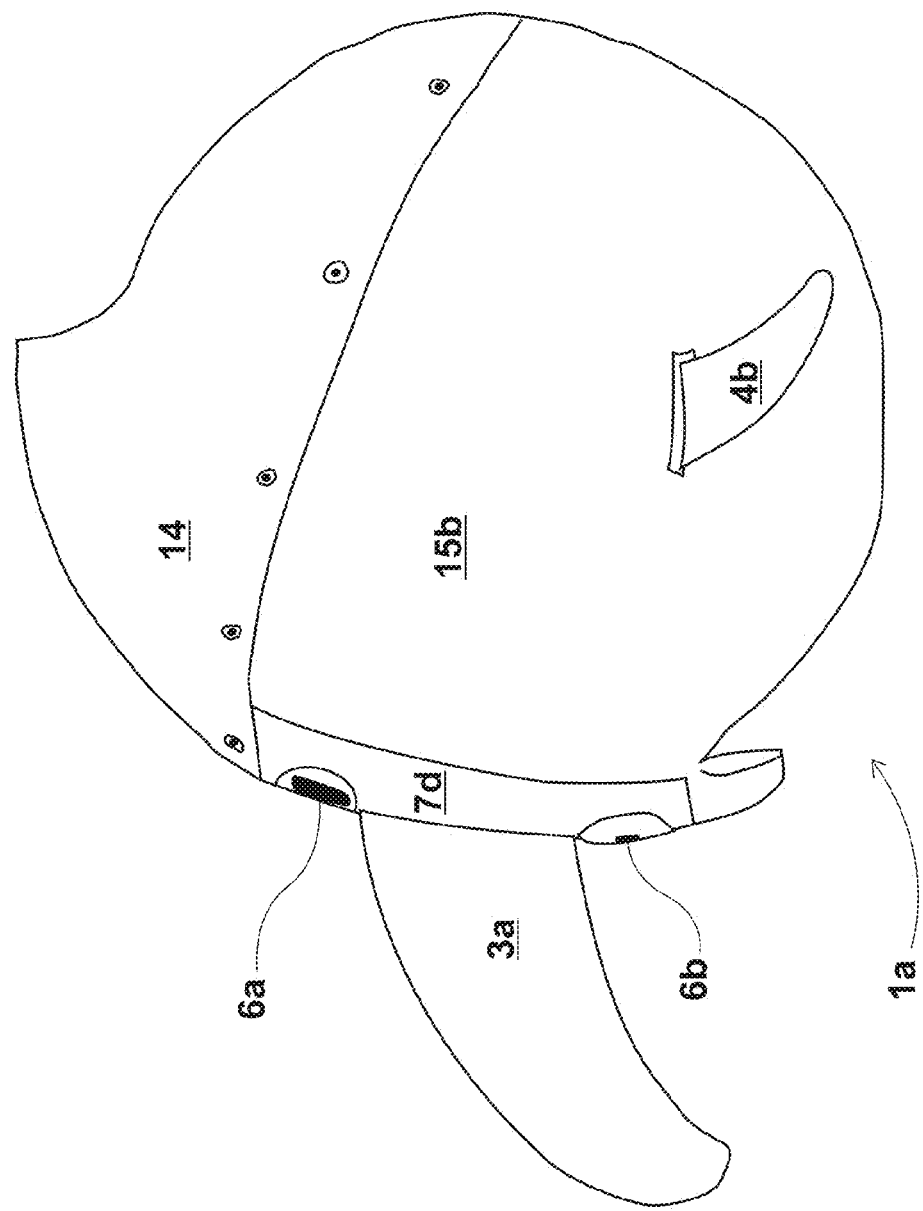
FIG. 3E is a side view of the version of the invention showing removable repositionable keels and flippers.

FIG. 3E illustrates bib 1a in side view with keel 3a towards the left.

Figure 3F:
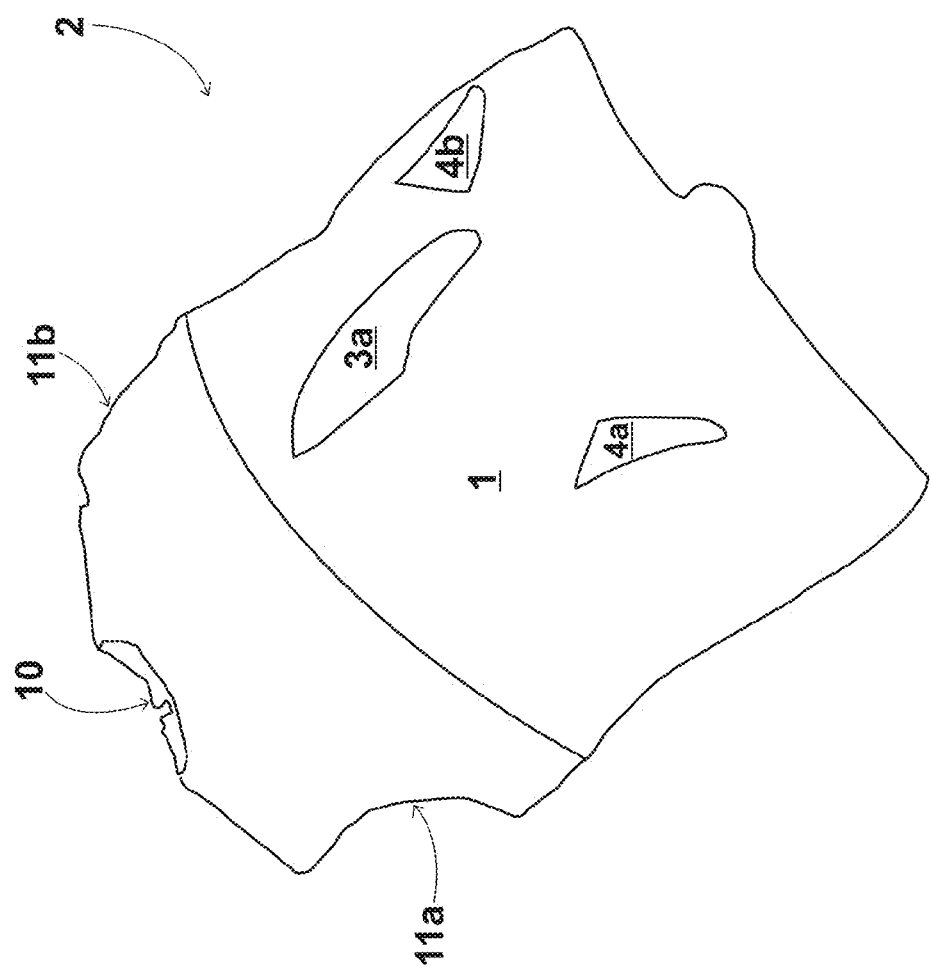
FIG. 3F is a perspective view of a short sleeveless wetsuit having the built-in surfing hydro-aerodynamic bib and including the keel and flippers seen.

FIG. 3F illustrates a short 2 sleeveless 11a, 11b wet suit and the area of the neck 10.

FIG. 4A shows bib 1b without a keel. On the aforementioned bib 5a and 5b are holes for adjusting base 7d of central keel 3a.

9b is the inner part of the quilting in FIGS. 4B and 8C.

9c corresponds to the selvage of the quilting, as can be seen in FIGS. 4B and 8C.

35 corresponds to the perimeter outline of the bib such as can be seen in FIGS. 4B and 8C.

In FIGS. 4B and 8C outline 35, 9c can be observed, and inside this outline are the inner areas distal from right side 34a and from left side 34b of the bib respectively.

FIG. 4B illustrates the inner part of bib 1b. Inside it are cells 8a, 8b, 8c, 8d, 8e and 8f; such cells having capacity to contain air and/or gas and/or oxygen and/or water and/or oil and/or grease and/or engines and/or batteries and/or floating materials, already described.

21 is the fastening base of the central keel depending on whether keel 3a or keel 3b is used, such as can be seen in FIG. 4B.

22 is the fastening base of the central keel depending on whether keel 3a or keel 3b is used, such as can be seen in FIG. 4B and in FIG. 8C.

FIG. 5 illustrates 1c, that is, the version of bib having a central keel 3b, removable and revolving around axis 7c and the latter in its turn installed over 7e, which in its turn is fastened by means of 6a and 6c. Likewise, such as can be seen in FIG. 5 removable flippers 4a, 4b revolving around their axes 7a and 7b respectively. The flippers and keel in the revolving version of the surfing bib seen in FIG. 5 can optionally be revolved in a motorized way, for example, by means of servomotors (not shown).

Figure 6:
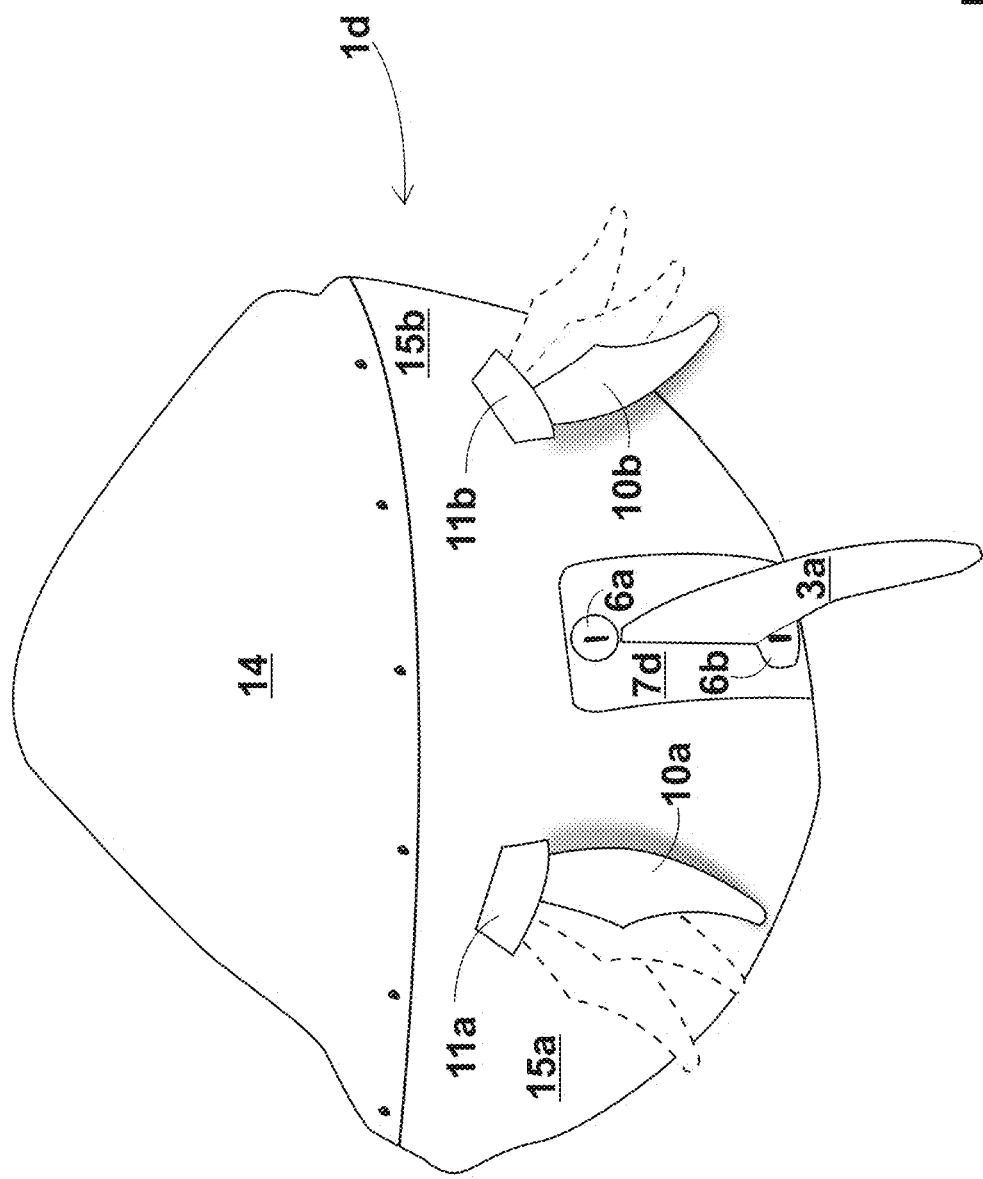
FIG. 6 is semi frontal view of the hydro-aerodynamic surfing bib showing folding side flippers.

FIG. 6 illustrates 1d, that is, the bib version having removable folding side flippers 10a, 10b with their axes 11a and 11b respectively.

Figure 7:
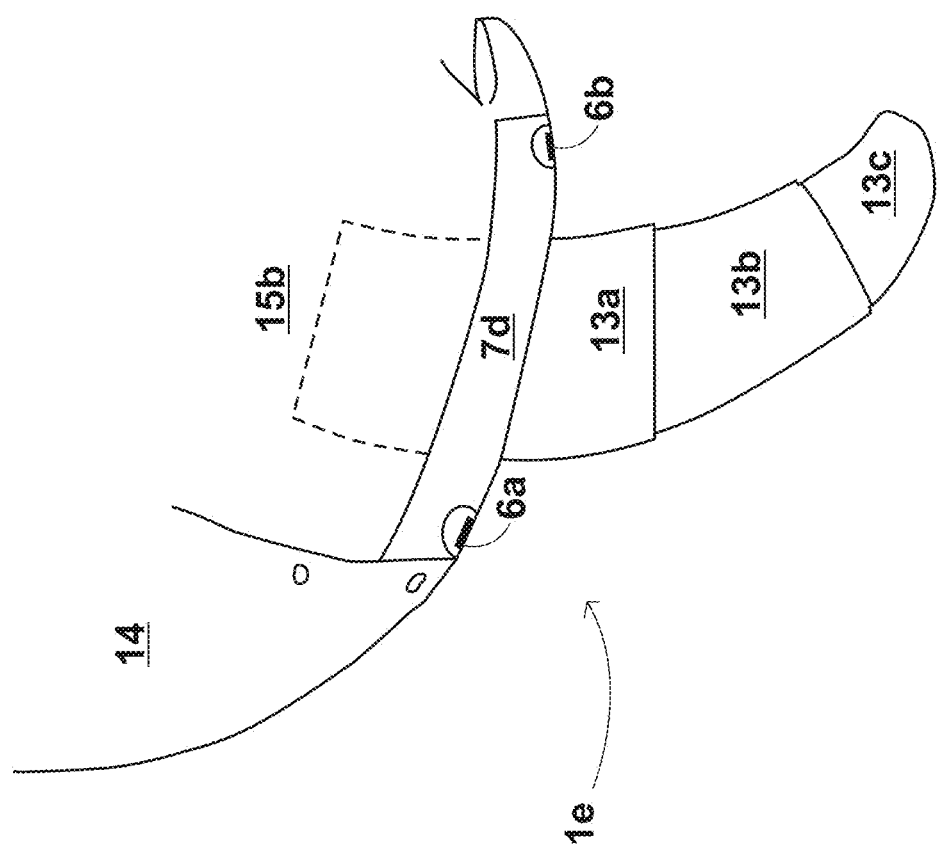
FIG. 7 is a view of a side part of the hydro-aerodynamic surfing bib, showing the retractable central keel.

FIG. 7 is a cross section 1e showing the bib version having the retractable central keel, with its sections 13a, 13b and 13c.

FIG. 8A illustrates the bib version for motorized surfing 1f, where 16 is the part through which water gets in, thanks to turboprop 17 revolving in 18. In FIG. 8A, 19a and 19b are the water and/or air outlets, resulting from the propulsion exerted by internal engine 23 seen in FIG. 8C. In FIG. 8A, 26a located on the right side of the bib, is a button for engine ignition which makes the turboprop revolve, and 26b located on the left side of the bib, is one button to provide acceleration up to 4 speeds.

FIG. 8B illustrates a cross section of 15a/15b showing button 26a/26b and the mechanism of inner spring 27.

FIG. 8C illustrates inner parts of the motorized bib version. In drawing 1f seen from behind, outline 35, 9c can be seen, inside this outline are the inner areas distal from the right side 34a and from the left side 34b of the bib respectively. Then, adjacent to such areas are inner containing cells 8a, 8b, 8c, 8d, 8e and 8f; then, at the center of the drawing 1f is mono-block 23 containing the per se known engine; for example of electric type, against which batteries 25a and 25b are leaned against each other and linked together, by means of settings 29, the latter being claimed in the present invention. The batteries are typical of the ones of the state of the current technique, and the ones here claimed. In FIG. 8C Nozzle oversleeves 20a and 20b are projected from side parts 30a and 30b of mono-block 23 respectively. Such nozzle oversleeves conduct the spouts of water and/or air, expelling them through 19a and 19b, hastily, causing the user of the motorized hydrodynamic bib to glide forwards.

FIG. 8D illustrates rear lid 1g with the concave central part 31a, 31b, 31c and 31d adaptable according to user's size and bust. The distal areas 32a of lid 1g, superimpose themselves to inner perimeter areas 34a and 34b respectively, of FIG. 8C.

35 of FIG. 8C is hermetically joined to selvage 36 of FIG. 8D.

33a is the right groove of the outlet of the nozzle oversleeve in FIG. 8D.

33b is the left groove of the outlet of the nozzle oversleeve in FIG. 8D.

The hydrodynamic surfing bib wet suit can be worn by children, teenagers and adults.

The hydrodynamic surfing bib wet suit in all its versions is brought out in several sizes, such as for example: extra large, large, medium, small and extra small.

Another version is that which covers thorax and abdomen.

The hydrodynamic surfing bib wet suit is basically intended for human beings; that should not prevent it from being applied and adapted to other beings, such as dogs.

The present invention is considered to be only an illustration of the principles of the invention. Besides, since it is highly probable that the experts in this matter will come up with numerous modifications and changes, it is not desired to limit the present invention to the exact construction and operation shown and described, therefore, every possible modification and equivalents can be resorted to, falling into the field of the present invention claimed.

The invention claimed is:

1. A hydrodynamic surfing bib wetsuit comprising:
A wetsuit that comprises one or more of the following: polyurethane foam, expanded polyestyrene EPS, closed cell foam;
A bib attached to the wetsuit that covers the thorax and/or the abdomen of the user;
At least one removable pectoral keel, wherein the removable pectoral keel has a length of between 1 cm and 100 cm and a base width between 1 cm and 40 cm wherein the removable pectoral keel further comprising a servomotor for steering the keel;
At least one removable pectoral flipper, wherein the removable pectoral flipper has a length of between 1 cm and 100 cm and a base width between 0.5 cm and 50 cm, and further comprising a servomotor for steering the flipper;
An inner celled swimming compartment filled with one or more of the following: a) air b) oxygen c) water d) oil e) grease f) floating materials;
Wherein the bib further comprises an inlet in the central pectoral region, a jet engine, and nozzle oversleeves wherein the nozzle oversleeves comprise a left nozzle oversleeve and a right nozzle oversleeve expelling liquids and/or gas from an inlet in a center of the pectoral region of the bib to left and right outlets respectively on the left and right sides of the bib;
Wherein the jet engine further comprises at least one electrical propulsion engine, at least one rechargeable battery, and at least one solar cell.

2. The hydrodynamic surfing bib wetsuit of claim 1 comprising one removable pectoral keel and two removable pectoral flippers.

* * * * *